United States Patent
Humblot et al.

(10) Patent No.: US 9,945,356 B2
(45) Date of Patent: Apr. 17, 2018

(54) ASSEMBLY OF SECTIONS OF STRUCTURAL PARTS

(71) Applicant: AIRBUS DEFENCE AND SPACE SAS, Les Mureaux (FR)

(72) Inventors: Antoine Humblot, Saint Medard en Jalles (FR); Francois Naud, Bordeaux (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 616 days.

(21) Appl. No.: 14/395,458

(22) PCT Filed: Apr. 16, 2013

(86) PCT No.: PCT/EP2013/057916
§ 371 (c)(1),
(2) Date: Oct. 17, 2014

(87) PCT Pub. No.: WO2013/156482
PCT Pub. Date: Oct. 24, 2013

(65) Prior Publication Data
US 2015/0132137 A1    May 14, 2015

(30) Foreign Application Priority Data
Apr. 20, 2012    (FR) ..................... 12 01173

(51) Int. Cl.
*F03D 1/06*    (2006.01)
*B29C 70/30*    (2006.01)
(Continued)

(52) U.S. Cl.
CPC ............ *F03D 1/0683* (2013.01); *B29C 70/30* (2013.01); *B29D 99/0025* (2013.01);
(Continued)

(58) Field of Classification Search
CPC ...... F03D 1/0675; F03D 1/0683; F03D 1/065; F03D 1/0633; F03D 1/0641; F03D 13/00; F03D 13/10
See application file for complete search history.

(56) References Cited

U.S. PATENT DOCUMENTS

2009/0136355 A1    5/2009    Finnigan et al.
2009/0162206 A1    6/2009    Zirin et al.
(Continued)

FOREIGN PATENT DOCUMENTS

ES    2343712 A1    8/2010
FR    2937687 A1    4/2010
(Continued)

OTHER PUBLICATIONS

JP 2004-11616 A machine translation. Accessed JPO website Jun. 21, 2017. 7 pages.*

*Primary Examiner* — Richard Edgar
(74) *Attorney, Agent, or Firm* — Im IP Law; C. Andrew Im

(57) ABSTRACT

A wing or blade in at least two sections facing each other. Each section has a longitudinal bearing structure provided with at least one sole of which the link between the sections includes at least one first link plate linking the end of the soles of the sections facing each other. A method of producing such wing or blade.

29 Claims, 4 Drawing Sheets

(51) Int. Cl.
B29D 99/00 (2010.01)
F01D 5/28 (2006.01)
F03D 13/10 (2016.01)

(52) U.S. Cl.
CPC ........... F01D 5/282 (2013.01); F03D 1/0633 (2013.01); F03D 13/10 (2016.05); *F05B 2240/302* (2013.01); *Y02E 10/721* (2013.01); *Y02E 10/728* (2013.01); *Y10T 156/10* (2015.01); *Y10T 156/1052* (2015.01)

(56) References Cited

U.S. PATENT DOCUMENTS

| | | |
|---|---|---|
| 2009/0226320 A1 | 9/2009 | Torres Martinez |
| 2011/0052403 A1* | 3/2011 | Kawasetsu ............ F03D 1/0675 416/226 |
| 2011/0142667 A1 | 6/2011 | Miebach et al. |
| 2011/0142679 A1 | 6/2011 | Bendel et al. |
| 2012/0045606 A1 | 2/2012 | Griess et al. |

FOREIGN PATENT DOCUMENTS

| | | | |
|---|---|---|---|
| FR | 2937689 A1 | 4/2010 | |
| FR | 2948154 A1 | 1/2011 | |
| JP | 2004011616 A * | 1/2004 | |
| WO | 2011/006800 A1 | 1/2011 | |
| WO | 2012/004571 A2 | 1/2012 | |
| WO | WO 2012004571 A2 * | 1/2012 | ........... F03D 1/0675 |

* cited by examiner

ASSEMBLY OF SECTIONS OF STRUCTURAL PARTS

RELATED APPLICATIONS

This application is a § 371 application from PCT/EP2013/057916 filed Apr. 16, 2013, which claims priority from French Patent Application No. 12 01173 filed Apr. 20, 2012, each of which is herein incorporated by reference in its entirety.

TECHNICAL FIELD OF THE INVENTION

The present invention relates to the assembly of sections of structural components and, in particular, to a technique for the assembly of structural components for wind turbine wings or blades in sections. It applies, in particular, to structural components made of composite materials and, notably, those including assemblies that are glued or secured by polymerization.

BACKGROUND OF THE INVENTION

Wind turbines are currently being designed with blades which can attain several tens of meters. Such blades clearly present numerous technical problems, and likewise logistical problems. The terrestrial or maritime transport of these structures can prove to be problematic, especially if the accessibility of the implantation zone is difficult.

From a technical point of view, the utilization of composite materials permits the blades to be lightened, and hence the stress on the entire structure of the wind turbine to be reduced.

From a logistical point of view, the assembly of sections of blades on site permits the criticality and the cost of the phases of transport to be reduced.

It is thus advantageous to be able to transport these blades in the form of sections that are subsequently assembled at the production site.

However, producing these sections and assembling them gives rise to the problem of the assembly of components made of composite materials, from the point of view of a mechanically optimized solution in terms of mass, cost and simplicity.

Different types of connections and methods of assembly are available for components such as sections of wind turbine blades, and reference may be made here, for example, to the types of connections and methods disclosed in documents FR 2 937 687 A1, FR 2 937 689 A1 in the name of the applicant, which propose solutions for which the sections may be folded over, and FR 2 948 154 A1, which proposes a solution having fasteners at the end provided by means of fittings extending a central box of the blade sections.

These connections and methods of assembly generally require numerous components and are based, in particular, on the utilization of interface means inserted between the composite parts of the sections.

It is also known to produce junctions of components by jointing.

OBJECT AND SUMMARY OF THE INVENTION

The object of the present invention is to propose a type of connection and a suitable method of manufacture for producing wings or blades in a plurality of sections permitting a simplified assembly of the sections during the construction of an aircraft or the construction of wind turbines. The present invention further makes it possible to achieve continuity of the sections that are placed end-to-end at the level of their connection and to avoid the addition of covers at the level of this connection.

According to one principle of the present invention, the sections are assembled by means of link plates and, as will be appreciated below, the connection and the method of the invention remain available on the installation site, in particular, in the case of wind turbine blades.

The present invention provides, to this end, a wing or blade in at least two sections facing each other, said sections each including a longitudinal bearing structure provided with at least one sole piece, for which the link between the sections comprises at least a first link plate linking the end of the sole pieces of said sections facing each other.

Advantageously, the end of the sole pieces of said sections receiving the link plate include an additional thickness of reinforcing material.

Preferably, the end of the sole pieces of said sections receiving the link plate forms a widened termination.

The sole pieces are advantageously made from axial folds of composite materials and are reinforced at the level of the terminations by biaxial folds in order to obtain a stack suitable for absorbing the forces of the fasteners.

The bearing structure for the sections advantageously further comprises a longitudinal member that is perpendicular to the sole piece, the connection further comprising at least one second link plate for connecting the longitudinal members of two consecutive sections.

According to one particular embodiment, the bearing structure for the sections is an H-section beam comprising two sole pieces and a longitudinal member linking the two sole pieces.

More particularly, the end of the bearing structure receives at least a first link plate per sole piece and at least a second link plate on the longitudinal member.

According to a preferred embodiment, slots are arranged between the longitudinal member and the sole pieces by reducing the height of the longitudinal member in the part receiving the first link plates, the first link plates linking the sole pieces being received in said slots.

According to one particular embodiment, the wing or blade includes intrados and extrados skins that are secured to the sole pieces.

The wing or blade advantageously includes internal profiles extending the sole pieces in a transverse direction in relation to the longitudinal bearing structure, the intrados and extrados skins and the internal profiles forming a sandwich structure of the blade.

According to one particular embodiment, the intrados and extrados skins include access doors to the link plates.

According to one particular embodiment, the fastening of the link plates is effected by means of bolted connections.

The skin/sole piece/internal profile assemblies are, in particular, composite assemblies secured by polymerization, these assemblies being connected by the first link plates.

The invention further proposes a method of producing a wing or blade including at least two sections, which, according to a first embodiment, comprises a step of laying up a first skin having the length of the wing on a form, a step of placing a first sole piece having the length of the wing on the first skin, a step of mating internal profiles on the first skin to either side of the first sole piece, a step of impregnation with resin and polymerization of the assembly followed by a step of placing a first first link plate on the sole piece which straddles a cutting zone of the wing in two sections, the link plate being secured to the sole piece on a first side of the cutting zone.

The first first link plate is preferably secured to the sole piece by bolting on the sole piece on the first side of the cutting zone.

In addition or as an alternative, the first first link plate is secured to the sole piece by gluing on the sole piece on the first side of the cutting zone.

The link plate is preferably fixed temporarily to the sole piece on a second side of the cutting zone.

The longitudinal bearing structure of each section comprising a second sole piece and a second skin, the method is advantageously repeated for the second sole piece and the second skin.

According to a second embodiment, the method comprises a step of laying up a first skin having the length of the wing on a form, a step of placing a first sole piece having the length of the wing on the first skin, a step of mating internal profiles on the first skin to either side of the first sole piece, a step of placing a first first link plate on the sole piece which straddles a cutting zone of the wing in two sections, the link plate being provided with means preventing the gluing of the link plate on the sole piece on a second side of the cutting zone followed by a step of impregnation with resin and polymerization of the assembly.

According to this second embodiment, the first first link plate is preferably bolted on the sole piece on the first side of the cutting zone.

Still according to this second embodiment, the link plate is advantageously fixed temporarily to the sole piece on a second side of the cutting zone.

The longitudinal bearing structure of each section comprising a second sole piece and a second skin, the second embodiment of the method is repeated for the second sole piece and the second skin.

The sections including longitudinal members which, together with the sole pieces, form an H-section beam, the first embodiment or the second embodiment of the method are advantageously followed by a step of jointing longitudinal members of the sections by means of at least a second link plate, a step of gluing longitudinal members that are jointed on the first jointed sole piece and a step of gluing the second sole piece on the longitudinal member on the side opposite the first sole piece by the blind closure of the wing or blade in order to perform the gluing of the second skin on the first skin that is equipped with the longitudinal member and the gluing of the longitudinal member on the second sole piece.

The method advantageously includes releasing the wing, cutting the skins and the sole pieces at the level of the cutting zone forming a junction of the sections and dismantling the first link plates on the side of the second section.

The first link plates being glued on a section, for example on the blade foot side, once cutting has taken place, the sections are preferably disassembled by dismantling the first link plates on the blade tip section side, the glued first link plates remaining in position in the blade foot section, and by dismantlings the second link plates of the longitudinal members.

Advantageously, the sections are assembled by insertion of the link plates of the blade foot section into the blade tip section by bolting the link plates on the sole piece of the blade tip section and by jointing longitudinal members.

BRIEF DESCRIPTION OF THE DRAWINGS

Other characterizing features and advantages of the invention will emerge from a perusal of the following description of a non-restrictive example of the invention with reference to the drawings, which depict.

DETAILED DESCRIPTION OF THE EMBODIMENTS

Figure 1:
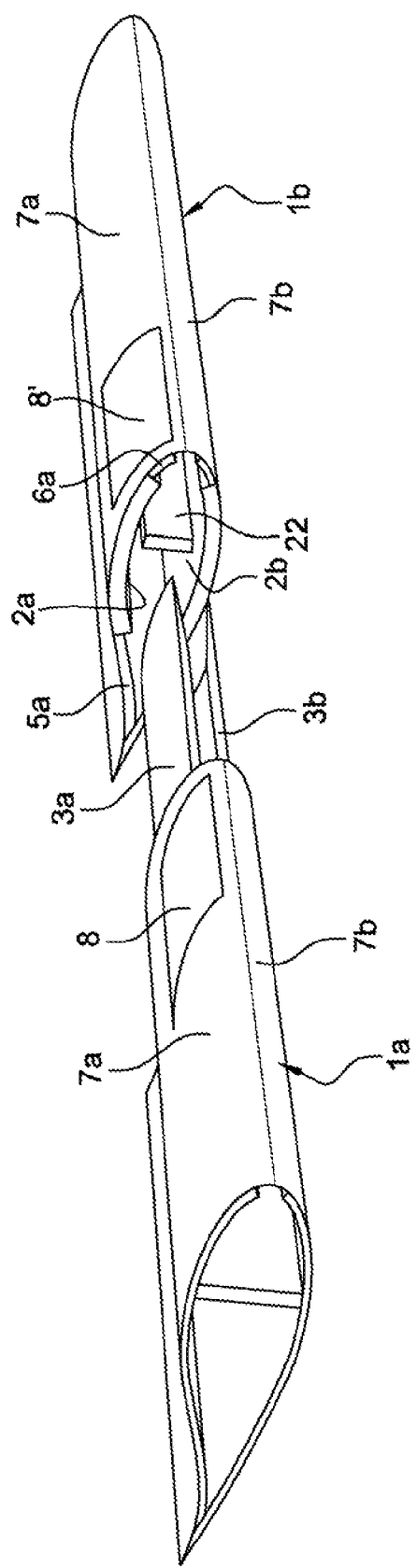
in FIG. 1: a view in perspective of two sections of a wing or a blade according to a particular embodiment of the invention in the course of assembly.

FIG. 1 depicts a wing or blade in at least two sections 1*a*, 1*b* facing each other.

According to the example the sections are assembled end-to-end.

The sections each include an extrados skin 7*a* and an intrados skin 7*b* and a longitudinal bearing structure 2*a*, 2*b*, 22 provided with sole pieces 2*a*, 2*b*.

The connection between the sections is executed by means of first link plates 3*a*, 3*b* linking the end of the sole pieces of said sections facing each other.

Figure 2:
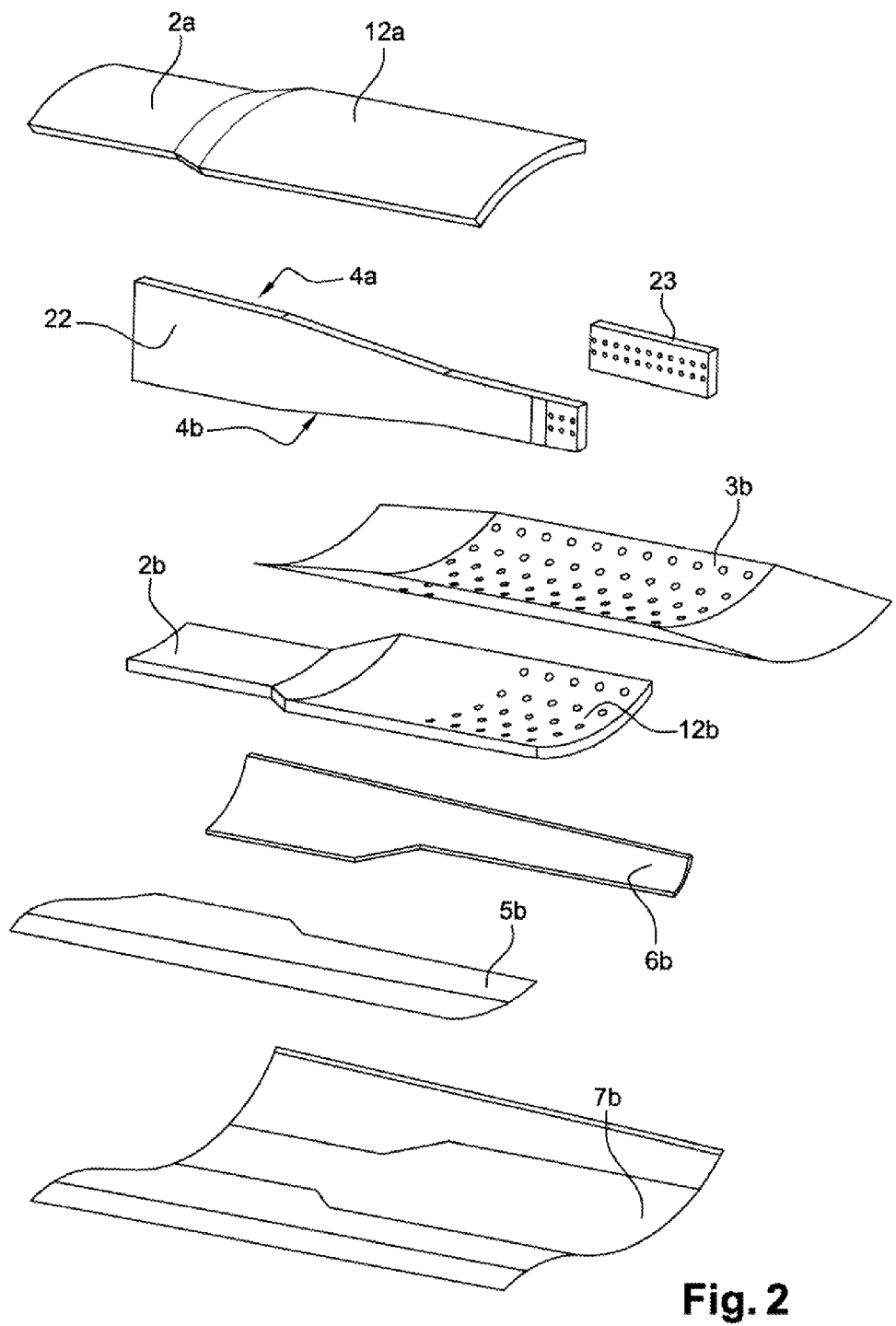
in FIG. 2: an exploded view of a part of a junction of a section in FIG. 1.

FIG. 2 is an exploded view of the end of a junction of one of the sections once the blade has been cut into sections.

The bearing structure in this case is made from two sole pieces 2*a*, 2*b* and a longitudinal member 22 perpendicular to the sole pieces which produce an extrados sole piece and an intrados sole piece.

The end 12*a*, 12*b* of the sole pieces to which the link plates are fixed includes additional reinforcing material, only the link plate 3*b* on the intrados side being depicted in FIG. 2 in order to simplify the diagram, the link plate 3*a* on the extrados side being a mirror-image of the link plate 3*b* in relation to the longitudinal member.

The end of the sole pieces receiving the first link plates forms a termination 12*a*, 12*b* that is widened in such a way that a wide fastening zone will be present at the level of the junctions where the sole piece link plates ensure the continuity of the two sections and absorb the forces of the fasteners.

Depicted at the level of the longitudinal member 22 is a second link plate 23 for connecting the longitudinal members of two sections 1*a*, 1*b*.

Also depicted in FIG. 2 are internal profiles 5*b*, 6*b*, which extend the sole piece 2*b* in a transverse direction in relation to the longitudinal bearing structure.

The intrados skin 7*b* is attached to the sole piece 2*b* and the internal profiles 5*b*, 6*b* which surround the sole piece 2*b* while adopting the widened form of the termination 12*b*.

The skin is produced starting with a fabric which extends beyond the sole piece on the whole of the external profile of the blade, and which will constitute the external skin 7*b* of the blade. The internal profile 5*a*, 5*b*, 6*a*, 6*b*, which is made for example with a foam, a honeycomb material, balsa or some other appropriate lightweight filler material, will then be constituted on the internal face of this fabric.

The skin and the internal profile produce a lightweight and inexpensive sandwich material. A second fabric intended to produce an internal skin terminating the sandwich is deposited on the internal profile, where appropriate.

The sandwich comprising the skins and the internal profiles together with the skin and the sole pieces will ensure the geometry of the blade.

In the case of a foam, a foam that is suitable for the method of resin infiltration, and, in particular, a foam having closed porosities, other than at the surface, is selected.

The foam includes channels permitting the resin to pass from one skin to the other of the sandwich during the infiltration of resin.

The same sole piece/internal profiles/blade configuration is present at the level of the extrados.

In the case of wings or blades made from composite materials, the sole pieces are made, in particular, from axial folds of composite materials and are reinforced at the level of the terminations by biaxial folds in order to obtain a stack suitable for absorbing the forces of the fasteners, for example matting, scribing or other.

The axial folds are made from UD (uni-directional) fabrics, which are oriented according to the axis of the blade (0 degrees).

The biaxial folds are fabrics of which the threads are at +/−45 degrees. This is either a stack of several UDs, or folds that are already provided with stacks.

It is also possible to utilize triaxial stacks including folds having orientations at + or −45 degrees, for example, for the link plates and the sole pieces in their reinforced zone 12a.

The sole piece of the blade is thus reinforced in order to take up the forces of the bolted connections. The assembly consisting of sole pieces and link plates will be loaded in traction compression and matting caused by the bolted connections. The fasteners take up the shear forces as well as the bending forces due to the considerable thickness of the elements to be assembled.

It should be noted that, according to the present invention, the sole pieces of the two sections are made in a single piece, and that the reinforced zones are thus present in a central part of the sole piece.

Figure 4:
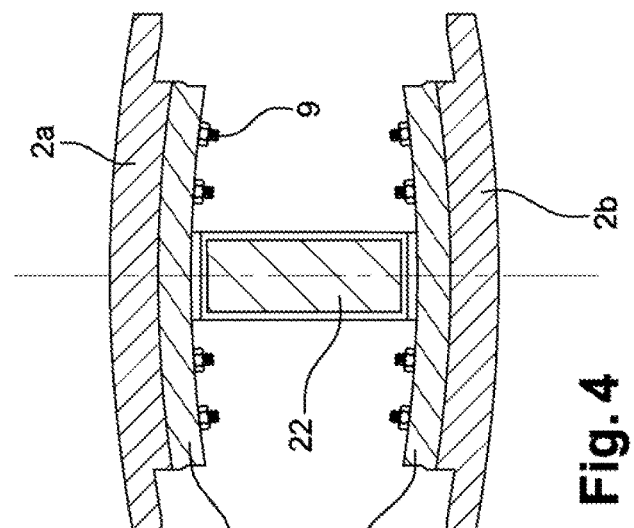
in FIG. 4: the structure of FIG. 3 in a front view.
Figure 3:
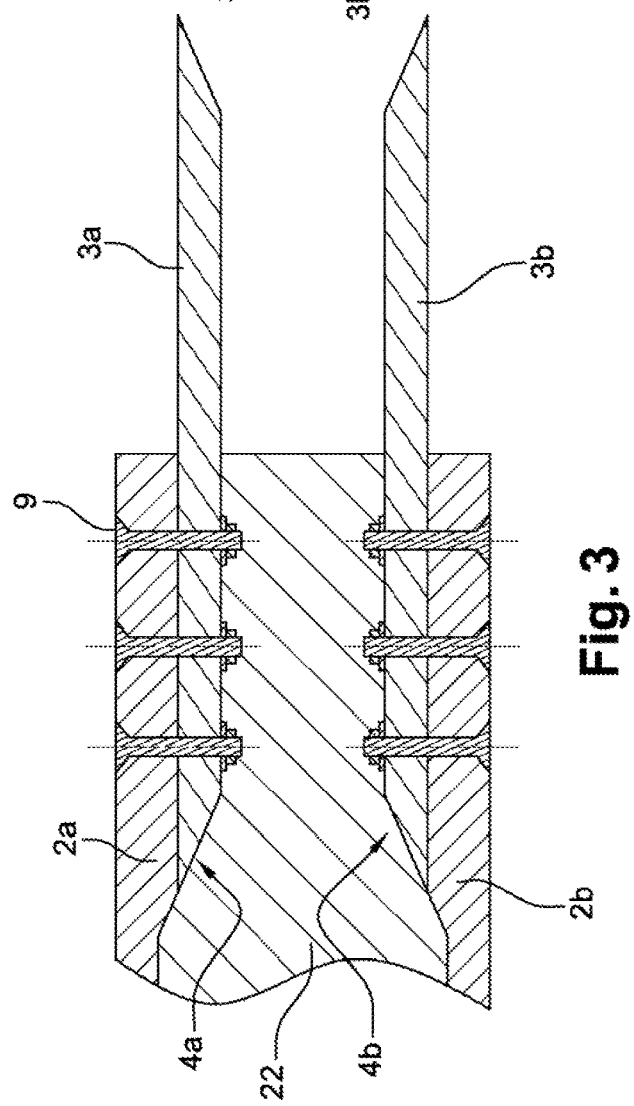
in FIG. 3: a schematic view of the side of a termination of an example of a bearing structure of a wing or a blade equipped with first link plates.

FIGS. 3 and 4 depict a bearing structure of the sections in the form of an H-section beam comprising two sole pieces 2a, 2b and a longitudinal member 22 linking the two sole pieces.

The bearing structure receives a first link plate 3a, 3b per sole piece, the first link plates linking the sole pieces being received in slots arranged between the longitudinal member 22 and the sole pieces 2a, 2b by reducing the height of the longitudinal member in the part 4a, 4b receiving the first link plates 3a, 3b.

The fastening of the link plates is effected by means of bolted connections 9.

The additional thickness of reinforcing material for the sole pieces and the first link plates fill any slots that are produced by the thinning of the end of the longitudinal member 22.

According to FIG. 4, the first link plates 3a, 3b are configured in such a way as to adopt the curvature of the sole pieces in a transverse direction.

The section equipped in this way includes a termination that is adapted to be inserted between the sole pieces and the longitudinal member of a second section during the assembly of a first and a second section.

Figure 5:
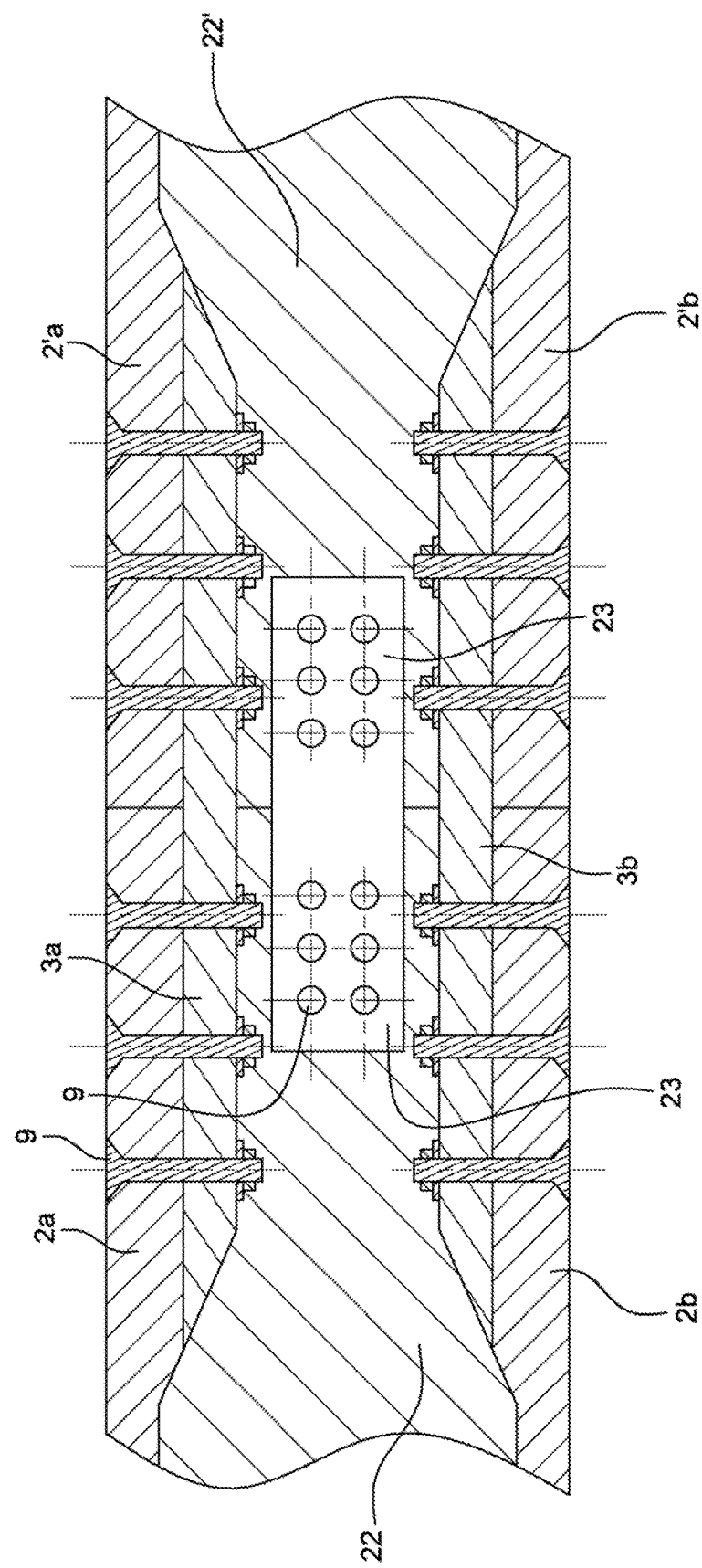
in FIG. 5: a side view of a finished junction between two bearing structures according to FIG. 3.

FIG. 5 depicts the finished junction between the sections.

The junction includes a second link plate 23 bolted on the longitudinal members 22, 22' of the two sections that are connected together. One or two link plates may be provided on one side or on both sides of the longitudinal members.

The link plates of longitudinal members ensure the continuity between the longitudinal members of each of the blade sections. The longitudinal members take up the shear forces acting upon the wing or the blade, and the second link plates likewise take up these forces at the level of the junction.

The height of the longitudinal member is reduced at the level of the connection in order to take account of the restricted dimension due to the presence of the additional thicknesses of the sole pieces and the link plates.

Returning to FIG. 1, the intrados and extrados skins include doors 8, 8' for access to the link plates permitting them to be bolted and, where appropriate, to be removed to permit dismantling of the sections. These doors are necessary in order to be able to undertake the assembly of the sections on site, and it must be sufficiently large to provide access to the link plates 23 and to their means of fastening on the sole pieces.

The assembly of the first link plates to the sections of blade is effected by means of bolted connections 9, of which the bolts are tightened through access doors. The continuity of the longitudinal member is likewise assured by means of a second bolted link plate 9.

The bolted connections permit a large part of the efforts of the sole piece to be transferred towards the link plate in order to assure the continuity of each of the sections, the bolted connection of the link plate of the longitudinal member permitting a part of the shear force to be transferred between the link plate and the longitudinal member.

The materials constituting the link plates, the sole pieces, the longitudinal member, the skins and the internal profiles are composite materials that are produced by means of fabrics, fibers and resins.

The composite materials utilized are, for example, glass fabrics and epoxy resin fabrics, although other technical composite materials can also be used.

The foams are preferably PVC foams.

In this context of the composite wing, the method of the invention permits the entire wing or the blade of the invention to be produced advantageously in a single jig or mold and then to be cut to produce the sections.

The principal advantage is that precise dimensioning is obtained at the level of the junctions. For this reason, the on-site assembly of the wing or of the blade is facilitated, and its profile does not include any break or defect requiring, for example, covering or a complementary operation.

A first embodiment of the method applicable to the invention includes the following steps.

Production of a reinforced intrados sole piece for the length of the two sections;
production of two sole piece link plates or first link plates;
production of a reinforced extrados sole piece for the length of the two sections;
production of two link plates of a longitudinal member or second link plates;
laying up of the external intrados skin in a half mold with positioning of the intrados sole piece, the internal profiles and the intrados internal skin, if necessary, followed by the injection of resin by infiltration under vacuum with a film on the side opposite the mold and by polymerization, the open mold being a heated mold;
positioning of the link plate on the sole piece, fitting the final fastening screws on a first lateral part of the link plate, while the second lateral part of the link plate receives a temporary fastening, for example by means of 2×6 disks with a diameter of 18 mm.

According to this operation, the link plate includes its final fastening on a side of the sole piece which will form a first section. The link plate, on the other hand, is maintained appropriately on a second side of the sole piece which will form a second section.

In other words, the link plate includes its final fastening on a first side of a cutting zone in order to produce the sections, the part of link plate of the second side of the cutting zone receiving only a temporary fastening.

It is possible in the context of the invention, as a first variant, to glue the link plate on the sole piece on the final fastening side.

In this case, a film preventing the gluing of the link plate on the temporary fastening side is applied, where appropriate.

Finally, as a second variant, consideration can also be given to fixing the link plate on the sole piece with the final fastenings of the two sides of the link plate.

In this case, however, care must be taken to avoid over tightening the link plate of the side that will require to be dismantled after separation of the sections, and to avoid any gluing of the link plate on the sole piece, at least on the side that is intended to be dismantled.

The same procedure as for the intrados side should be adopted for the extrados side.

Subsequently, the blind closure of the wing or blade then takes place in order to perform the gluing of the extrados on the intrados equipped with the longitudinal member cut beforehand, the gluing of the longitudinal member on the second sole piece and the gluing together of the leading and trailing edges of the wing or the blade.

Of course, the inverse procedure may be adopted for these steps by reversing the intrados and extrados skins.

The method then proceeds by releasing the assembly.

Once the blade has been released, the operations of finishing, drilling of the blade foot, deburring of the leading edge and of the trailing edge are carried out, after which the blade is painted and balanced.

The skins and the sole pieces of the blade are then cut at the location which will form the junction of the sections.

The blade is cut once it has been assembled. Only the longitudinal member is cut before closing the profiles.

The sole piece is cut at the same time as the skins in order to produce the sections, and the cutting depth is managed in such a way as not to attack the link plates.

Access doors are cut in the skins, and the link plates are dismantled from the side of the section on which they are not glued.

All of the final drillings are executed in such a way that the sections can be stored and transported separately and then assembled once more on the construction site of the wind turbine and the electricity production site.

One of the sections thus includes the first bolted link plates, while the other section lacks these and includes the drilling necessary to receive and to bolt the link plates subsequently.

It should be noted that, in order to avoid the gluing of the link plates on the part of the sole piece where the link plates are required to be detachable, the latter are covered with a separation film or a fabric, for example a release film based on PTFE.

The link plates thus continue to be detachable on the part of the sole piece that is intended to form the sole piece of one of the sections and are fixed permanently on the sole piece part of the other section.

The sections that are produced together in one and the same mold and in the form of the complete wing or blade are matched and fit together perfectly.

The link plates being glued and/or permanently bolted on a section, for example on the blade foot side, the blade tip section can be withdrawn once cutting has taken place. The link plates that are glued and/or permanently bolted on the blade foot section remain in position in the blade foot section.

For example, FIG. 3 depicts the end of the section on which the link plate is fixed by gluing and bolting during the production of the wing or of the blade.

The sections may be stored and transported in dismantled form and then assembled on the assembly site of the aircraft or the construction site of the wind turbine.

For the assembly of the wing or the entire blade, it is then sufficient to bring the two sections together as far as the insertion of the parts of the link plates into the bearing structure of the second section, and then to bolt the link plates on the bearing structure of the second section.

According to a second embodiment of the method of producing blades, the following steps are carried out.

Production of a reinforced intrados sole piece for the length of the two sections;

production of two link plates of sole pieces or first link plates;

production of a reinforced extrados sole piece for the length of the two sections;

production of two link plates of a longitudinal member or second link plates;

laying up of the external intrados skin in a half mold with positioning of the intrados sole piece, internal profiles and, if necessary, the internal intrados skin.

At this stage, the variant involves positioning the first link plate on the sole piece before polymerization, one side of the link plate being protected against the gluing.

The injection of resin by infiltration under vacuum with a film on the side opposite the mold and polymerization is then undertaken in the open heated mold.

Once the intrados of the blade has been polymerized, it is possible to complete the final fastening of the link plate on the side that is glued to the sole piece and to apply temporary fastenings on the non-glued side.

As for the first embodiment, the method is performed in an identical manner for the extrados of the blade, the two profiles are then glued together with the longitudinal member and the sections are then cut.

The components constituting the blades or wings of the invention have been dimensioned mechanically in accordance with the forces that they are required to endure and, in particular, tensile stresses, compressive stresses, shear stresses, etc., but likewise for the connection between sections at the level of the screwed fasteners in accordance with the scribing and matting forces.

According to one particular embodiment, the current sole pieces are made from unidirectional composite material, the skins and the longitudinal members are made from biaxial material at +/−45 degrees, the reinforcing sole pieces and the link plates are made from triaxial material at 0, +/−45 degrees.

It should be noted that the skin/sole piece/internal profile assemblies are composite assemblies secured by polymerization, said assemblies being connected by the first link plates.

The invention is not restricted to the depicted example and may be applied in particular to a wing or a blade including more than two sections.

The invention claimed is:

1. A wing or blade in at least two sections facing each other, each section comprising a longitudinal bearing structure provided with at least one sole piece, the longitudinal bearing structure of each section comprising a longitudinal member perpendicular to the sole piece; wherein a link between the sections comprises at least one first link plate linking an end of the sole piece of each section facing each other; and wherein a slot is arranged between the longitudinal member and the sole piece of each section facing each other by reducing a height of the longitudinal member in a part receiving the first link plate, the first link plate linking the sole pieces being received in said slot.

2. The wing or blade as claimed in claim 1, wherein the end of the sole piece of each section receiving the first link plate comprises an additional thickness of reinforcing material.

3. The wing or blade as claimed in claim 1, wherein the end of the sole piece of each section receiving the first link plate forms a widened termination.

4. The wing or blade as claimed in claim 3, wherein the sole pieces are made from axial folds of composite materials and are reinforced at a level of the widened terminations by biaxial folds to obtain a stack to absorb forces of fasteners.

5. The wing or blade as claimed in claim 1, wherein the link further comprises at least one second link plate for connecting the longitudinal members of two consecutive sections.

6. The wing or blade as claimed in claim 5, further comprising intrados and extrados skins that are secured to the sole pieces, and wherein the intrados and extrados skins comprise access doors to the first and second link plates.

7. The wing or blade as claimed in claim 5, wherein the longitudinal bearing structure of each section is an H-section beam comprising two sole pieces and a longitudinal member linking the two sole pieces.

8. The wing or blade as claimed in claim 7, wherein an end of the longitudinal bearing structure of each section receives at least one first link plate per sole piece and at least one second link plate on the longitudinal member.

9. The wing or blade as claimed in claim 1, further comprising intrados and extrados skins that are secured to the sole pieces.

10. The wing or blade as claimed in claim 9, further comprising internal profiles extending the sole pieces in a transverse direction in relation to the longitudinal bearing structure, the intrados and extrados skins and the internal profiles forming a sandwich structure of the blade.

11. The wing or blade as claimed in claim 10, wherein assemblies of the intrados and extrados skins, the sole pieces and the internal profiles are composite assemblies secured by polymerization, the assemblies being connected by the first link plates.

12. The wing or blade as claimed in claim 1, further comprising bolted connections to fasten the first link plates.

13. A method of producing a wing or blade comprising at least two sections as claimed in claim 1, comprising the steps of:
    laying up a first skin having a length of the wing on a form;
    placing a first sole piece having a length of the wing on the first skin;
    mating internal profiles on the first skin to either side of the first sole piece;
    impregnating an assembly of the first skin, the first sole piece and the internal profiles with a resin, and polymerizing the assembly; and
    placing the first link plate on the first sole piece which straddles a cutting zone of the wing in two sections, the link plate being secured to the first sole piece on a first side of the cutting zone.

14. The method as claimed in claim 13, further comprising the step of bolting the first link plate to the first sole piece on the first side of the cutting zone.

15. The method as claimed in claim 13, further comprising the step of gluing the first link plate to the first sole piece on the first side of the cutting zone.

16. The method as claimed in claim 13, further comprising the step of temporarily fixing the first link plate to the first sole piece on a second side of the cutting zone.

17. The method as claimed in claim 13, wherein each section comprises a longitudinal bearing structure comprising a second sole piece and a second skin, the method further comprises the step of repeating the steps of laying up the first skin, placing the first sole piece, mating the internal profiles, impregnating and polymerizing the assembly, and placing the first link plate for the second sole piece and the second skin.

18. The method as claimed in claim 17, wherein the sections comprising longitudinal members which, together with the first sole pieces, form an H-section beam, the method further comprising the steps of:
    jointing the longitudinal members of the sections by at least one second link plate; gluing the longitudinal members that are jointed on the first sole piece; and
    gluing the second sole piece on the longitudinal member on a side opposite the first sole piece by a blind closure of the wing or blade to perform the gluing of the second skin on the first skin that is equipped with the longitudinal member and gluing of the longitudinal member on the second sole piece.

19. The method as claimed in claim 18, further comprising the steps of releasing the wing, cutting the first and second skins and the sole pieces at a level of the cutting zone forming a junction of first and second sections, and dismantling the first link plate on a side of the second section.

20. The method as claimed in claim 19, further comprising the steps of gluing the first link plate on a blade foot side of a section; and disassembling the sections after the step of cutting by dismantling the first link plate on a blade tip section side, the first link plate glued and remaining in position in a blade foot section, and dismantling the second link plate of the longitudinal member.

21. The method as claimed in claim 20, further comprising the step of assembling the sections by inserting link plates of the blade foot section into the blade tip section by bolting the link plates on a sole piece of the blade tip section and by jointing the longitudinal members.

22. The method of producing a wing or blade comprising at least two sections as claimed in claim 1, comprising the steps of:
    laying up a first skin having a length of the wing on a form;
    placing a first sole piece having a length of the wing on the first skin;
    mating internal profiles on the first skin to either side of the first sole piece;
    placing the first link plate on the first sole piece which straddles a cutting zone of the wing in two sections, the first link plate being configured to prevent gluing of the first link plate on the first sole piece on a second side of the cutting zone; and impregnating an assembly of the first skin, the first sole piece, internal profiles and the first link plate with a resin, and polymerizing the assembly.

23. The method as claimed in claim 22, further comprising the step of bolting the first link plate on the first sole piece on the first side of the cutting zone.

24. The method as claimed in claim 22, further comprising the step of temporarily fixing the first link plate to the first sole piece on a second side of the cutting zone.

25. The method as claimed in claim 22, wherein each section comprises a longitudinal bearing structure comprising a second sole piece and a second skin, the method further comprises the step of repeating the steps of laying up the first skin, placing the first sole piece, mating the internal profiles, placing the first link plate, impregnating and polymerizing the assembly for the second sole piece and the second skin.

26. The method as claimed in claim 25, wherein the sections comprising longitudinal members which, together with the first sole pieces, form an H-section beam, the method further comprising the steps of:
   jointing the longitudinal members of the sections by at least one second link plate;
   gluing the longitudinal members that are jointed on the first sole piece; and
   gluing the second sole piece on the longitudinal member on a side opposite the first sole piece by a blind closure of the wing or blade to perform the gluing of the second skin on the first skin that is equipped with the longitudinal member and gluing of the longitudinal member on the second sole piece.

27. The method as claimed in claim 26, further comprising the steps of releasing the wing, cutting the first and second skins and the sole pieces at a level of the cutting zone forming a junction of first and second sections, and dismantling the first link plate on a side of the second section.

28. The method as claimed in claim 27, further comprising the steps of gluing the first link plate to a section of a blade foot; and disassembling the sections after the step of cutting by dismantling the first link plate on a blade tip section, the first link plate glued and remaining in position in a blade foot section, and dismantling the second link plate of the longitudinal member.

29. The method as claimed in claim 28, further comprising the step of assembling the sections by inserting link plates of the blade foot section into the blade tip section by bolting the link plates on a sole piece of the blade tip section and by jointing the longitudinal members.

* * * * *